2,953,531

CERIUM POLYMERIZATION CATALYSTS

Arthur William Anderson and Nicholas George Merckling, Wilmington, Del., assignors to E. I. du Pont de Nemours and Company, Wilmington, Del., a corporation of Delaware No Drawing. Filed Sept. 21, 1954, Ser. No. 457,528

2 Claims. (Cl. 252—429)

This invention relates to novel catalyst systems and more particularly to novel cerium catalyst systems used in the production of solid ethylene polymers and the process of polymerizing ethylene using novel cerium catalysts.

Heretofore, it has been widely known that ethylene can be converted to solid polymers under very high pressures in the presence of catalysts which are capable of yielding free radicals under polymerization conditions.

It has also been known heretofore (U.S. Patents 2,212,155, 2,475,520, 2,467,234) that certain metal alkyls and Grignard reagents are capable of initiating the conversion of ethylene to solid polymers through a free radical mechanism. Ethylene has also been converted to solid polymers in the presence of hydrogenation catalysts, particularly in the presence of alkali metals or alkali metal hydrides (British Patent 536,102).

Generally speaking, Friedel-Crafts type catalysts have not been effective for converting ethylene to solid polymers but instead have resulted in the formation of liquid polymers from ethylene; however, it has recently been reported that solid polymers admixed with oils can be obtained by polymerizing ethylene in the presence of aluminum chloride and titanium chloride at elevated temperatures and pressures and advantageously in the presence of HCl-binding metals like aluminum powder (Fischer, German Patent 874,215 Ausgegeben April 20, 1953).

Redox systems have frequently been disclosed for polymerization of olefinic compounds. In the past, redox systems have resulted in the formation of highly branched low density polymers, except at extremely high superpressures, at which high density ethylene polymers have been obtained heretofore. In many of these systems a heavy metal compound was employed in combination with a reducing component (cf. U.S. Patents 2,380,473 and 2,383,425). While various theories have been advanced as to the mechanism of polymerization in redox systems, the art of polymerizing olefins in the presence of such combinations of catalyst components has not heretofore advanced to the state at which predictions could be made as to which pairs of oxidizable and reducible components might give good results in the conversion of ethylene to solid polymers except, of course, by further experimentation.

It has been dsicovered, in accordance with the present invention, that extraordinary and highly useful effects are produced by combining cerium in a valance state below 3 with organic compounds containing ethylenic unsaturation. In specific embodiments, it has been found that cerium compounds having a valence state of below 3 which may be combined with radicals (suitable examples being alkoxy radicals, alkyl radicals, and radicals which form acids when combined with hydrogen) can be used effectively in the polymerization of ethylene; said active cerium is generally obtained by admixing a cerium compound having a valance state in excess of 2 with a reducing agent. The quantity of reducing agent which is present must be sufficient to convert the cerium at least in part to a valence state below 3. Coordination of the active cerium with organic compounds does not necessarily destroy its ability as a catalyst. It appears that ethylene is capable of coordinating the active cerium in this manner, and quite possibly, this phenomena has a bearing on the mechanism of the polymerization. There is evidence, as explained hereinafter, that compounds which complex preferentially tend to suppress the polymerization reaction.

The nature of these coordination complexes is not fully understood, but they are active catalysts or catalyst components which are capable of initiating the polymerization of ethylene in an extremely active manner to produce solid ethylene polymers. The density of the polymers obtained through the use of these coordination complexes generally exceeds, at least to some extent, the density of polyethylene prepared by the use of free radical types of catalyst, except those free radical polymerization processes which employ such extremely high pressures as to produce abnormally-high density polyethylene as compared with polyethylene made at moderately high pressure (700–1200 atmospheres), by a free radical polymerization process (cf. U.S. Patent 2,586,322).

It is believed that the coordination complexes hereinabove dsecribed are novel compounds which have not been employed heretofore in the polymerization of ethylene. The complexes are difficult to isolate in the pure state, but their presence can be detected from the chemical properties of the mixtures produced when a cerium compound having a valence state of 3 and higher is reduced at least in part to a valence state below 3 and admixed with an ingredient which can form a complex with the active cerium.

While the polymerization of ethylene to produce solid poymers in the presence of the catalysts herein disclosed can be carried out under mild conditions, it is preferable from an economic standpoint to employ moderately high pressures, suitable from 10 to 200 atmospheres or higher, in order to facilitate the handling of ethylene. Much higher pressures, up to several thousand atmospheres, can be employed, but it is not economically desirable to do this in view of the extraordinary activity of the catalysts at lower pressures. Similarly, extremely low temperatures may be employed. The temperatures used in the practice of this invention are within the range of about 0° C. to 300° C.

The polymerization of ethylene according to the process of this invention, takes place most satisfactorily when the polymerization mixture is substantially moisture-free and also free of other sources of hydroxyl groups. As in numerous other ethylene polymerization processes, the polymerization mixture in the process of this invention is preferably kept free of oxygen since oxygen reacts with the catalyst. In practical operations the oxygen content should preferably be held below 20 parts per million. Certain compounds which are capable of coordinating with the active cerium form complexes which ar too stable for optimum results, and accordingly, the presence of these compounds should preferably (although not necessarily) be avoided. In this category are ketones and esters. Hydrocarbon solvents, on the other hand, can be used quite effectively as reaction media.

The reducing agents which are effective for reducing the valence of the cerium to an average of below 3, are compounds which have at least one metal to hydrocarbon or at least one metal to hydrogen bond and active reducing metals. In these classes the following may be mentioned:

(1) Grignard reagents.
(2) Metal alkyls or aryls and similar organometallic compounds.
(3) Metal hydrides.
(4) Active metals, e.g. alkaline or alkaline earth metals.

In specific embodiments the catalyst described in the process of this invention may be used in a dissolved form or in a finely dispersed form. The catalyst may be prepared in in situ or in a prior step. In the latter case caution should be exercised to keep the catalyst mixture free from oxygen and moisture.

The invention is illustrated further by means of the following examples.

*Example 1.*—Into a shaker tube there was charged 0.01 mole of cerium trichloride, 0.04 mole of phenyl magnesium bromide as a solution in diethyl ether, and 100 cc. of cyclohexane. The shaker tube was pressured with 2,500 p.s.i. of ethylene and shaken for 3 hours at 190° C. The resulting solid polymer was washed with methanol, methanol-hydrochloric acid mixture and finally with acetone. The polymer produced weighed 11 grams in a dry form and exhibited a density of 0.97 and could be compression molded at 190° C. into tough films.

*Example 2.*—Cerium trichloride (.01 mole) was charged into a glass vessel and .03 mole of phenyl magnesium bromide as a solution in diethyl ether and 100 cc. of cyclohexane were added. The mixture was heated for 2 hours at 80° C. under nitrogen. The resulting precipitate was filtered and slurried in 100 cc. of cyclohexane. This mixture was then charged into a shaker tube and pressured with 2,500 p.s.i. of ethylene and shaken for 2 hours at 180° C. The resulting solid polymer was washed with methanol, methanol and hydrochloric acid, and acetone. The polymer produced weighed 20 grams in a dry form and exhibited a density of 0.96 and could be compression molded at 190° C. into a tough film.

It is to be observed that the foregoing examples are illustrative only and that numerous embodiments of the invention will occur to those who are skilled in the art.

As hereinabove indicated, the reducing component of the polymerization mixture can be varied rather widely, but it is essential that the reducing component be a sufficiently strong reducing agent and also that it be employed in sufficient quantity to reduce the valence of the cerium, and form at least in part the active cerium.

The products obtained by polymerizing ethylene with catalysts hereinabove disclosed are solid polymers exclusively and are not contaminated with Friedel-Crafts type of oily polymers.

The activity of the catalyst depends in part upon the nature of the groups which are attached to the cerium atom. It is quite possible that this effect depends upon the amount of shielding around the cation, i.e., the shielding power of the group attached to cerium influences the activity of the catalyst by influencing the tendency of the cerium to coordinate. Electrical effects may also play a part in this.

The quantity of catalyst employed can be varied over a rather wide range. It is desirable to employ a quantity of catalyst which is at least large enough to produce a reasonably rapid rate for a reasonably long period of time. Suitably, the preferred quantity is within the range of 0.01% to 10% based on the weight of Ce per unit weight monomer.

The polymers which are made under the conditions hereinabove described frequently have such high molecular weights that removal of catalyst by dissolving and filtering is extremely difficult. The best procedure for obtaining the polymer in a clean form is to wash with acetone-hydrochloric acid mixture in a Waring Blendor several times followed by washing with acetone and thereafter, if necessary, followed by several acetone-aqueous sodium hydroxide washes and finally by acetone-water wash. The products thus obtained are generally white. While this procedure is highly satisfactory for preparing clean polymers, it is to be understood that simpler procedures such as treatment with water at elevated temperatures will be entirely suitable for various practical applications. For some applications it may not be essential to remove traces of catalyst.

The structure of the polyethylene made in accordance with the process of this invention evidently is characterized by being a straight chain hydrocarbon, with vinyl groups at one or both ends of at least some of the molecules. The infrared measurements indicate very little methyl substitution and a very small number of vinylidene groups with little or no transunsaturation or carbonyl groups.

The catalysts used in the process of this invention are well suited for the polymerization of ethylenically unsaturated compounds other than ethylene, such as propylene, butadiene, styrene, etc., and copolymers of these.

The ethylene polymers obtained in accordance with the process of this invention are valuable in numerous applications, especially in the form of films, molded articles, and extruded insulation on wire.

We claim:

1. A composition of matter suitable as a polymerization catalyst consisting essentially of the reaction product obtained on admixing, in an inert hydrocarbon solvent, cerium trichloride with sufficient quantities of a Grignard reagent to reduce the valence state to below 3, in the substantial absence of oxygen and water.

2. The process as set forth in claim 1 wherein the Grignard reagent is phenyl magnesium bromide.

References Cited in the file of this patent

UNITED STATES PATENTS

| | | |
|---|---|---|
| 2,485,535 | Park | Oct. 18, 1949 |
| 2,666,756 | Boyd | Jan. 19, 1954 |

OTHER REFERENCES

Gilman et al.: "Relative Reactivities of Organometallic Compounds," J. Am. Chem. Soc., 61, 957–9, 1939.